United States Patent
Kang et al.

(10) Patent No.: US 12,464,632 B2
(45) Date of Patent: Nov. 4, 2025

(54) RAY GENERATING DEVICE AND CONTROL METHOD THEREOF

(71) Applicants: TSINGHUA UNIVERSITY, Beijing (CN); NUCTECH COMPANY LIMITED, Beijing (CN)

(72) Inventors: Kejun Kang, Beijing (CN); Yaohong Liu, Beijing (CN); Huaibi Chen, Beijing (CN); Liang Zhang, Beijing (CN); Chuanxiang Tang, Beijing (CN); Yuanjing Li, Beijing (CN)

(73) Assignees: TSINGHUA UNIVERSITY, Beijing (CN); NUCTECH COMPANY LIMITED, Beijing (CN)

( * ) Notice: Subject to any disclaimer, the term of this patent is extended or adjusted under 35 U.S.C. 154(b) by 114 days.

(21) Appl. No.: 18/575,277

(22) PCT Filed: Jul. 5, 2022

(86) PCT No.: PCT/CN2022/103769
§ 371 (c)(1),
(2) Date: Dec. 28, 2023

(87) PCT Pub. No.: WO2023/280130
PCT Pub. Date: Jan. 12, 2023

(65) Prior Publication Data
US 2024/0334585 A1    Oct. 3, 2024

(30) Foreign Application Priority Data

Jul. 9, 2021 (CN) .......................... 202110779750.3

(51) Int. Cl.
*H05H 7/02* (2006.01)
*H05G 1/32* (2006.01)
*H05H 7/12* (2006.01)

(52) U.S. Cl.
CPC ................ *H05H 7/02* (2013.01); *H05G 1/32* (2013.01); *H05H 7/12* (2013.01); *H05H 2007/027* (2013.01)

(58) Field of Classification Search
None
See application file for complete search history.

(56) References Cited

U.S. PATENT DOCUMENTS

| 4,801,848 A | 1/1989 | Birnbach et al. |
| 6,734,428 B2 | 5/2004 | Parker et al. |

(Continued)

FOREIGN PATENT DOCUMENTS

| CN | 2917188 Y | 6/2007 |
| CN | 101076218 A | 11/2007 |

(Continued)

OTHER PUBLICATIONS

First OA Received in JP Application No. 2023-580688; mailed Aug. 27, 2024.

(Continued)

*Primary Examiner* — Wilson Lee
(74) *Attorney, Agent, or Firm* — Kilpatrick Townsend & Stockton LLP

(57) ABSTRACT

A ray generating device and a control method thereof are provided. The ray generating device includes: an electronic beam generating device; a microwave generating device; a microwave circulator, having a power input port and at least two power output ports, the power input port being connected to the microwave generating device; a plurality of accelerating tubes respectively connected to at least two power output ports, configured to respectively receive a plurality of electronic beams, and accelerate electronic beams respectively through microwaves received from the at least two power output ports, and to respectively generate a (Continued)

plurality of rays having at least two different energies; and a controller, configured to perform chronological control on microwave power of the microwave generating device, and chronological control on beam loadings of the electronic beams generated by the electronic beam generating device and respectively corresponding to accelerating tubes.

13 Claims, 3 Drawing Sheets

(56) References Cited

U.S. PATENT DOCUMENTS

| | | |
|---|---|---|
| 6,844,689 B1 | 1/2005 | Brown et al. |
| 12,317,405 B2 * | 5/2025 | Shinton .................. H01P 3/127 |
| 2007/0269013 A1 | 11/2007 | Liu et al. |
| 2010/0219776 A1 | 9/2010 | Liu et al. |
| 2011/0206179 A1 | 8/2011 | Bendahan |
| 2014/0167873 A1 | 6/2014 | Helszajn |
| 2014/0185775 A1 | 7/2014 | Tang et al. |
| 2015/0245463 A1 | 8/2015 | Nighan, Jr. et al. |
| 2015/0359080 A1 * | 12/2015 | Dolgashev ............... H05H 7/02 315/505 |
| 2016/0135278 A1 | 5/2016 | Sun et al. |
| 2017/0265291 A1 * | 9/2017 | Nighan, Jr. .............. H05H 7/02 |
| 2020/0113038 A1 | 4/2020 | Mishin |
| 2021/0018649 A1 * | 1/2021 | Kang ...................... H05H 7/18 |
| 2021/0023397 A1 | 1/2021 | Zhao et al. |
| 2021/0138267 A1 * | 5/2021 | Nord ...................... A61N 5/103 |
| 2023/0039675 A1 * | 2/2023 | Turk ........................ G21K 1/02 |

FOREIGN PATENT DOCUMENTS

| | | |
|---|---|---|
| CN | 200987235 Y | 12/2007 |
| CN | 101163372 A | 4/2008 |
| CN | 102484935 A | 5/2012 |
| CN | 102804326 A | 11/2012 |
| CN | 203192747 U | 9/2013 |
| CN | 103906340 A | 7/2014 |
| CN | 104188679 A | 12/2014 |
| CN | 106455288 A | 2/2017 |
| CN | 206237663 U | 6/2017 |
| CN | 108392741 A | 8/2018 |
| CN | 208509358 U | 2/2019 |
| CN | 209676567 U | 11/2019 |
| CN | 113329552 A | 8/2021 |
| EP | 2983012 B1 | 8/2018 |
| WO | 2011008718 A1 | 1/2011 |

OTHER PUBLICATIONS

ISR Received in PCT/CN2022/103769; mailed Sep. 21, 2022.
Written Opinion received in PCT/CN2022/103769; mailed Sep. 21, 2022.
First OA received in CN Application No. 202110779750.3; mailed Nov. 23, 2022.
The Extended European Search Report issued in European corresponding application No. 22836881.7 mailed on Jun. 12, 2025, 9 pages.

* cited by examiner

RAY GENERATING DEVICE AND CONTROL METHOD THEREOF

CROSS-REFERENCES TO RELATED APPLICATIONS

The present disclosure is a national phase application of International Application No. PCT/CN2022/103769, filed on Jul. 5, 2022, which claims priority to Chinese Application No. 202110779750.3, filed on Jul. 9, 2021, the entireties of which are herein incorporated by reference.

FIELD

The present disclosure relates to the field of accelerators, in particular to a ray generating device and a control method thereof.

BACKGROUND

In security inspection equipment of large-scale vehicles/containers in the fields of customs, civil aviation and railway transportation, an electron linear accelerator system is mostly used as an X-ray generating device. The high-energy X-rays generated by the generating device can perform nondestructive testing on objects with different thicknesses and masses, and quickly realize effective recognition of objects to be inspected and recognition and marking of contrabands contained in the objects to be inspected without opening boxes, and to ensure personal and property security of citizens and maintain social stability.

In related radiation imaging field, the object to be inspected is recognized and detected mainly by utilizing an X-ray projection imaging technology. According to requirements of the application location and recognition accuracy, multiple radioactive sources are generally adopted to form multi-view radiation imaging.

SUMMARY

One aspect of the present disclosure provides a ray generating device, including:
- an electronic beam generating device, configured to generate a plurality of electronic beams;
- a microwave generating device, configured to generate a microwave;
- a microwave circulator, having a power input port and at least two power output ports, the power input port being connected to the microwave generating device through a waveguide structure;
- a plurality of accelerating tubes, connected to the electronic beam generating device and respectively connected to the at least two power output ports, configured to receive a plurality of electronic beams generated by the electronic beam generating device, respectively, and accelerate electronic beams respectively through microwaves received from the at least two power output ports, and to generate rays having different energies, respectively; and
- a controller, in signal connection with the electronic beam generating device and the microwave generating device, configured to perform chronological control on microwave power of the microwave generating device, and chronological control on beam loadings of the electronic beams generated by the electronic beam generating device and respectively corresponding to accelerating tubes.

In some embodiments, the electronic beam generating device includes:
- a first electronic gun, configured to generate a first electronic beam;
- a first electronic gun power source in signal connection with the controller and connected to the first electronic gun, configured to adjust the beam loading of the first electronic beam according to a chronological control signal provided by the controller;
- a second electronic gun, configured to generate a second electronic beam; and
- a second electronic gun power source in signal connection with the controller and connected to the second electronic gun, configured to adjust a beam loading of the second electronic beam according to a chronological control signal provided by the controller,
- and the controller is configured to allow the first electronic gun power source to adjust the beam loading of the first electronic beam to be a first beam loading at a first time period in each period of at least one period, and to allow the second electronic gun power source to adjust the beam loading of the second electronic beam to be a second beam loading at a second time period in each period, the first time period does not coincide with the second time period.

In some embodiments, the first beam loading is less than or equal to the second beam loading.

In some embodiments, at least two power output ports of the microwave circulator include a first power output port and a second power output port, the first power output is allocated with a microwave signal fed from the power input port, and the second power output port is allocated with a microwave signal fed from the first power output port; and accelerating tubes include:
- a first accelerating tube connected to the first power output port and the first electronic gun, configured to accelerate the first electronic beam through a first output microwave signal output by the first power output port; and
- a second accelerating tube connected to the second power output port and the second electronic gun, configured to accelerate the second electronic beam through a second output microwave signal output by the second power output port.

In some embodiments, at least two power output ports of the microwave circulator further include a third power output port, the third power output port is allocated with a microwave signal fed from the second power output port; and the ray generating device further includes: an absorbing load connected to the third power output port, configured to absorb a microwave signal output by the third power output port.

In some embodiments, the microwave circulator includes a four-port circulator.

In some embodiments, the controller is configured to allow a microwave signal fed by the microwave generating device to the power input port of the microwave circulator to include at least one first input microwave signal at the first time period, and to allow the microwave signal fed by the microwave generating device to the power input port of the microwave circulator to include at least one second input microwave signal at the second time period, and power of the at least one first input microwave signal is greater than that of the at least one second input microwave signal.

In some embodiments, the microwave generating device includes a magnetron.

One aspect of the present disclosure provides a control method of the above-mentioned ray generating device, and the control method includes:

performing chronological control on the microwave power of the microwave generating device through the controller, and performing chronological control on the beam loadings of electronic beams respectively corresponding to accelerating tubes generated by the electronic beam generating device, and accelerating tubes accelerate electronic beams, respectively, to generate rays having different energies.

In some embodiments, the electronic beam generating device includes: a first electronic gun and a second electronic gun respectively generating a first electronic beam and a second electronic beam, and a first electronic gun power source and a second electronic gun power source in signal connection with the controller and connected with the first electronic gun and the second electronic gun, respectively;

and the step of performing chronological control on the beam loadings of electronic beams respectively corresponding to accelerating tubes through a controller includes:

through the controller, allowing the first electronic gun power source to adjust the beam loading of the first electronic beam to be a first beam loading at a first time period in each period of at least one period, and allowing the second electronic gun power source to adjust the beam loading of the second electronic beam to be a second beam loading at a second time period in each period, and the first time period does not coincide with the second time period.

In some embodiments, at least two power output ports of the microwave circulator include a first power output port and a second power output port, the first power output is allocated with a microwave signal fed from the power input port, and the second power output is allocated with a microwave signal fed from the first power output port; accelerating tubes include: a first accelerating tube connected with the first power output port and the first electronic gun and a second accelerating tube connected with the second power output port and the second electronic gun, and the step of performing chronological control on the microwave power of the microwave generating device through the controller includes:

through the controller, allowing a microwave signal fed by the microwave generating device to the power input port of the microwave circulator to include at least one first input microwave signal at the first time period, and allowing a microwave signal fed by the microwave generating device to the power input port of the microwave circulator to include at least one second input microwave signal at the second time period, and power of at least one first input microwave signal is greater than that of at least one second input microwave signal.

In some embodiments, the at least one first input microwave signal includes two first input microwave signals located at different portions of the first time period, the power of the two first input microwave signals is the same or different, and the first beam loadings of the first electronic beam corresponding to different portions of the two first input microwave signals at the first time period are the same or different.

In some embodiments, the at least one second input microwave signal includes two second input microwave signals located at different portions of the second time period, the power of the two second input microwave signals is the same or different, and the second beam loadings of the second electronic beam corresponding to different portions of the two second input microwave signals at the second time period are the same or different.

BRIEF DESCRIPTION OF THE DRAWINGS

The accompanying drawings, which form part of the description, illustrate embodiments of the present disclosure and together with the description, serve to explain the principles of the present disclosure.

The present disclosure can be more clearly understood from the following detailed descriptions with reference to the accompanying drawings, in which.

Figure 1:
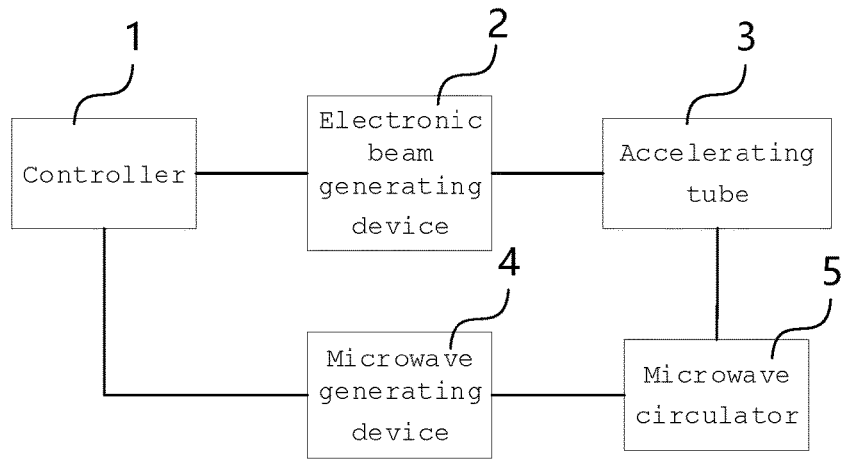
FIG. 1 is a structure diagram in some embodiments according to a ray generating device of the present disclosure.

It should be understood that the dimensions of various parts shown in the accompanying drawings are not drawn according to an actual scale relationship. In addition, the same or similar reference signs indicate the same or similar components.

DETAILED DESCRIPTION OF THE DISCLOSURE

Various exemplary embodiments of the present disclosure will now be described in detail with reference to the accompanying drawings. The descriptions of the exemplary embodiments are merely illustrative and are in no way intended to limit the present disclosure, and application or uses thereof. The present disclosure can be implemented in many different forms and is not limited to the embodiments described herein. These embodiments are provided, and the present disclosure will be thorough and complete, and will fully convey the scope of the present disclosure. It should be noted that unless otherwise specified, the relative arrangement of components and steps, the composition of materials, numerical expressions and numerical values set forth in these embodiments should be interpreted as merely illustrative and not as limitative.

Similar words of "first", "second" and the like used in the present disclosure do not indicate any order, quantity or importance, but are only used to distinguish different parts. Similar words such as "including" or "comprising" mean that the elements before the word cover the elements listed after the word, without excluding the possibility of covering other elements. "Upper", "lower", "left", "right" and the like are only used to indicate a relative positional relationship. After the absolute position of a described object changes, the relative positional relationship may also change accordingly.

In the present disclosure, when it is described that a specific device is located between a first device and a second device, there may be an intervening device between the specific device and the first device or the second device or not. When it is described that the specific device is connected to other devices, the specific device may be directly connected to the other devices without the intervening device, and may also have the intervening device without being directly connected to the other devices.

All terms (including technical terms or scientific terms) used in the present disclosure have the same meanings to which the present disclosure belongs, unless otherwise defined particularly. It should also be understood that the terms defined in, for example, general dictionaries should be interpreted as having the meanings consistent with their meanings in the context of the related art, and should not be interpreted in an idealized or extremely formal sense unless explicitly defined herein.

Technologies, methods and equipment known may not be discussed in detail, but the technologies, methods and equipment should be regarded as part of the description under appropriate circumstances.

The inventor found through researches that, a single ray source has a problem that substances which are overlapped on an image are difficult to be distinguished in terms of single-angle imaging due to a transmission imaging principle; while a multi-ray source generally requires cooperation of groups of detectors, to lead to an increase of system cost and having requirements on the installation space.

In view of this, embodiments of the present disclosure provide a ray generating device and a control method thereof, which are capable of implementing requirement of multi-energy spectrum detection of objects.

FIG. 1 is a structure diagram in some embodiments according to a ray generating device of the present disclosure. Refer to FIG. 1, in some embodiments, the ray generating device includes an electronic beam generating device 2, a microwave generating device 4, a microwave circulator 5, accelerating tubes 3, and a controller 1.

The electronic beam generating device 2 is configured to generate electronic beams. In some embodiments, the electronic beam generating device 2 may cause electronic guns to generate electronic beams with the same or different beam loadings, respectively, by means of different high voltage amplitudes generated by a pulse modulator.

The microwave generating device 4 is configured to generate a microwave. In some embodiments, the microwave generating device 4 may generate varying operating currents by means of different amplitudes of voltage output from the pulse modulator, to generate microwave signals of different power. In some other embodiments, the microwave generating device 4 may also generate microwave signals of different power through variations of the magnetic field intensity.

The microwave circulator 5 has a power input port and at least two power output ports, and the power input port is connected to the microwave generating device 4 through a waveguide structure. The microwave circulator 5 has isolation characteristics and power allocation characteristics, and can transmit microwave energies along a single direction. By connecting the single microwave generating device 4 to the power input port of the microwave circulator 5, microwave energies fed from the power input port can be allocated to a specific power output port, and reflected microwave energies received by that power output port can be allocated to another power output port. By utilizing such characteristic of the microwave circulator 5 in conjunction with the chronological control of the microwave generating device 4, it is possible to achieve microwave energy output of more than two ports through the microwave generating device 4 as a single microwave power source.

Accelerating tubes 3 are connected to the electronic beam generating device 2, and connected to the at least two power output ports, respectively. Accelerating tubes 3 can receive a plurality of electronic beams generated by the electronic beam generating device 2, respectively, and accelerate electronic beams respectively through the microwaves received from the at least two power output ports, and to generate a plurality of rays having different energies, respectively. The accelerated electronic beams may generate rays, such as X-rays, by bombarding a target.

The controller 1 is in signal connection with the electronic beam generating device 2 and the microwave generating device 4, and is configured to perform chronological control on microwave power of the microwave generating device 4, and chronological control on beam loadings of the electronic beams generated by the electronic beam generating device 2 and respectively corresponding to accelerating tubes 3. Through the chronological control performed by the controller 1 on the microwave generating device 4 and the electronic beam generating device 2, accelerating tubes 3 can respectively generate rays of different energies through a microwave power source, and to implement the inspection requirement of multi-energy spectrum coverage of an object, and improving the wire resolution indexes of the system while ensuring the penetrability.

Figure 2:
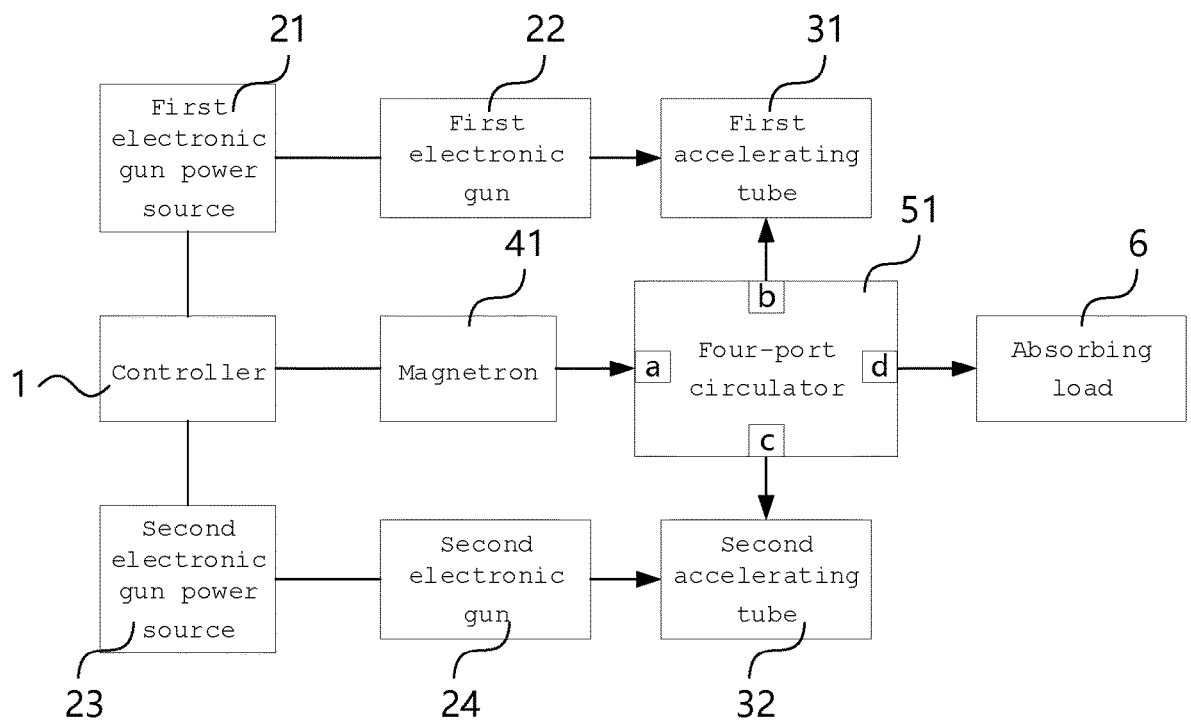
FIG. 2 is a structure diagram in some other embodiments according to a ray generating device of the present disclosure.
Figure 3:
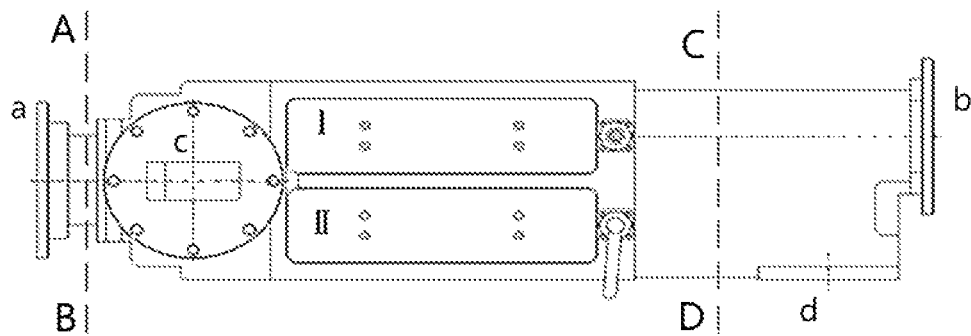
FIG. 3 is a structure diagram of a four-port circulator in some embodiments according to a ray generating device of the present disclosure.

FIG. 2 is a structure diagram in some other embodiments according to a ray generating device of the present disclosure. FIG. 3 is a structure diagram of a four-port circulator in some embodiments according to a ray generating device of the present disclosure. Referring to FIG. 2, in some embodiments, the electronic beam generating device 2 includes a first electronic gun 22, a first electronic gun power source 21, a second electronic gun 24, and a second electronic gun power source 23. The first electronic gun 22 is configured to generate a first electronic beam. The second electronic gun 24 is configured to generate a second electronic beam. Each electronic gun power source and the microwave generating device may be powered by the same AC power source (e.g., 380V).

The first electronic gun power source 21 is in signal connection with the controller 1 and connected to the first electronic gun 22, and is configured to adjust the beam loading of the first electronic beam according to a chronological control signal provided by the controller 1. The second electronic gun power source 23 is in signal connection with the controller 1 and connected to the second electronic gun 24, and is configured to adjust the beam loading of the second electronic beam according to a chronological control signal provided by the controller 1. The controller 1 may adjust voltages applied to the electronic guns by sending a chronological control signal (e.g., pulse width modulation signal) to the electronic gun power sources to further adjust the beam loadings of the electronic beams.

Refer to FIG. 2 and FIG. 3, in some embodiments, at least two power output ports of the microwave circulator 5 include a first power output port b and a second power output port c, the first power output b is allocated with a microwave signal fed from the power input port a, and the second power output c is allocated with a microwave signal fed from the first power output port b. The microwave signal fed from the first power output port b may be a reflected microwave signal that is reflected back after being output outward from the first power output port b.

In FIG. 2, accelerating tubes 3 include a first accelerating tube 31 and a second accelerating tube 32. The first accelerating tube 31 is connected to the first power output port b and the first electronic gun 22, and is configured to accelerate the first electronic beam through a first output microwave signal output by the first power output port b. The second accelerating tube 32 is connected to the second power output port c and the second electronic gun 24, and is configured to accelerate the second electronic beam through a second output microwave signal output by the second power output port c. The accelerated first and second electronic beams may generate X-rays of different energies by bombarding a target.

In some other embodiments, the electronic beam generating device may include more than three electronic guns and corresponding electronic gun power sources thereof, and the ray generating device includes more than three accelerating tubes. Accordingly, the accelerating tubes are connected to more than three power output ports of the microwave circulator, respectively, and to realize output of more types of ray energies through the chronological control of the controller and implement the multi-energy spectrum inspection requirements and multi-viewpoint scanning requirements to the objects.

Referring to FIG. 2, in some embodiments, at least two power output ports of the microwave circulator 5 further include a third power output port d. The third power output port d is allocated with a microwave signal fed from the second power output port c. The microwave signal fed from the second power output port c may be a reflected microwave signal that is reflected back after being output outward from the second power output port c. The ray generating device may further include an absorbing load 6 connected to the third power output port d. The absorbing load can absorb the microwave signal output from the third power output port d to realize an isolation effect to prevent the microwave signal from returning to the power input port of the microwave circulator.

Referring to FIG. 3, in some embodiments, the microwave circulator 5 includes a four-port circulator 51. The four-port circulator 51 has four ports, which are a power input port a, a first power output port b, a second power output port c and a third power output port d in the power transmission sequence, respectively, that is, the power transmission rule of the four-port circulator 51 is a→b→c→d. In some other embodiments, the microwave circulator 5 may further include a combination structure of a plurality of three-port circulators and four-port circulators connected in series.

FIG. 3 illustrates the structure of a ferrite four-port circulator. The four-port circulator is a coupled device including a dual-T joint, a nonreciprocal phase shifter based on ferrite field-displacement effect, and a 3 dB coupler. During the operation of the ray generating device, an electromagnetic wave of which the amplitude is E0 is fed from the power input port a. Due to the dual-T (H branch) characteristic, electromagnetic waves with equal amplitude of $E0/(2^{(1/2)})$ and equal phase will be output from waveguides I and II at side A-B. The nonreciprocal phase shifter can allow phase of the electromagnetic wave in the waveguide I to be 90° ahead relative to that in the waveguide II when the electromagnetic wave is forwardly transmitted from side A-B to side C-D (and conversely, the phase in the waveguide II is 90° ahead relative to the phase in the waveguide I if it is reversely transmitted from side C-D to side A-B), and the 3 dB coupler from side C-D to a location between the first power output port b and the third power output port d can cause the microwave power in the waveguides I and II to be equally divided to the first power output port b and the third power output port d, respectively, but the phase shift is increased by 90° during the coupling transmission, and all microwave power output from the waveguide I and the waveguide II to the first power output port b and the third power output port d, respectively, is output from the first power output port b, but is not output at the third power output port d.

Similarly, the microwave power input from the first power output port b is allocated to the second power output port c for output, and the microwave power input from the second power output port c is allocated to the third power output port d for output. Accordingly, the reflected microwave input from the first power output port b is allocated to the second power output port c for output, and the reflected wave from the second power output port c will be transmitted to the third power output port d and absorbed by the absorbing load.

In some embodiments, the chronological control by the controller 1 causes the first accelerating tube connected to the first power output port b to obtain larger power and energy to output at least one type of X-rays with a higher energy, for example, X-rays with output energies of 6 MeV and 3 MeV; and the chronological control by the controller 1 causes the second accelerating tube connected to the second power output port c to obtain smaller power and energy to output at least one type of X-rays with a lower energy, such as X-rays with output energies of 0.5 to 1 MeV. In this way, the effect of power allocation is achieved by differences of the microwave power output from different power output ports of the microwave circulator, and accelerating tubes with different energies can be driven by utilizing the power allocation characteristic of the microwave circulator, and to implement various inspection requirements.

Figure 4:
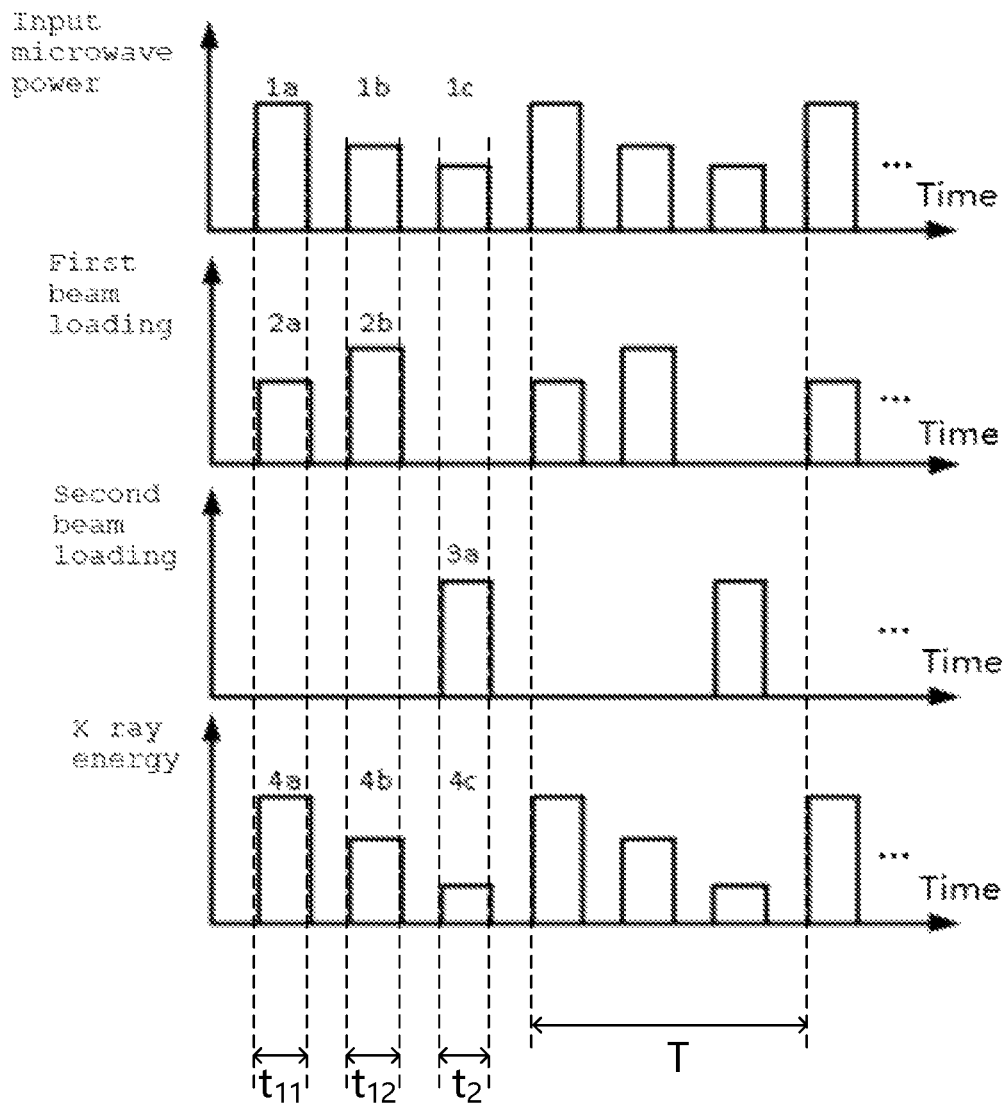
FIG. 4 is a schematic diagram of a chronological control and ray energy output according to some embodiments of the ray generating device of the present disclosure.

FIG. 4 is a schematic diagram of chronological control and ray energy output according to some embodiments of the ray generating device of the present disclosure. Please referring to FIG. 4, in some embodiments, the controller 1 is configured to cause the first electronic gun power source 21 to adjust the beam loading of the first electronic beam to be the first beam loading at the first time period in each period T of at least one period T, and cause the second electronic gun power source 23 to adjust the beam loading of the second electronic beam to be the second beam loading at the second time period in each period T, and the first time period does not coincide with the second time period.

The controller 1 is further configured to cause the microwave signal fed by the microwave generating device 4 into the power input port a of the microwave circulator 5 to include at least one first input microwave signal at the first time period, and cause the microwave signal fed by the microwave generating device 4 into the power input port a of the microwave circulator 5 to include at least one second input microwave signal at the second time period, and the power of at least one first input microwave signal is greater than the power of at least one second input microwave signal.

Sequential control instructions sent by the above controller 1 achieves alternate operating mode of the first accelerating tube 31 and the second accelerating tube 32, and the first accelerating tube 31 and the second accelerating tube 32 can generate X-rays of different energies at different time periods of each period T in cooperation with power distribution effects of the microwave circulator 5. In some embodiments, the X-rays generated by the first accelerating tube 31 and the second accelerating tube 32 can be arranged to irradiate towards different directions, to achieve multi-view radiation imaging.

In FIG. 4, the magnetron 41 inputs three pulsed microwave power of different amplitudes in sequence to the power input port a of the four-port circulator 51 in each period T, that is, the highest pulsed microwave power 1a is input at the first time period t11, the second highest pulsed microwave power 1b is input at the first time period t12, and the lower pulsed microwave power 1c is input at the second time period t2. Corresponding to the first time periods t11 and t12, the first electronic beam is configured with the first beam loadings 2a and 2b, respectively. Corresponding to the second time period t2, the second electronic beam is configured with the second beam loading 3a. In some embodiments, the first beam loading is less than or equal to the second beam loading, for example, in FIG. 4, the second beam loading 3a is approximately equal to the first beam loading 2b and is greater than the first beam loading 2a.

The formula of the beam loading effect can be represented as follows: $E=(A*P)^{0.5}-B*I$. E is the energy of the accelerated electronic beam, I is the intensity of the accelerated electronic beam (that is, the beam loading), P is the pulsed microwave power fed into the accelerating tube, and A and B are predetermined constants. According to the beam loading effect, high-energy electronic beams having different energies will be obtained when different electronic beams are accelerated. Referring to FIG. 4, the greater the beam loading, the smaller the power of the microwaves fed into the accelerating tube, and the smaller the energy obtained when the electronic beam is accelerated in the accelerating tube, otherwise, the smaller the beam loading, the larger the power of the microwaves fed into the accelerating tube, and the greater the energy obtained when the electronic beam is accelerated in the accelerating tube.

At the first time periods t11 and t12, the first electronic beam is configured with first beam loadings 2a and 2b. The pulsed microwave powers 1a and 1b input at the first time period t11 and the first time period t12 respectively are fed into the first accelerating tube 31 through the first power output port b of the four-port circulator 51. Since the pulsed microwave power 1a is greater than the pulsed microwave power 1b, and the first beam loading 2a is less than the second beam loading 2b, the first accelerating tube respectively generates X-rays having two different energies, higher and lower energies 4a and 4b (for example, 6 MeV and 3 MeV) at the first time period t11 and the first time period t12.

Since the microwave energy fed into the first accelerating tube 31 is used for acceleration of the first electronic beam, fewer reflected microwaves are returned from the first power output port b. While at the first time period, the second electronic beam is not configured with a beam loading, therefore, reflected microwaves entering the first power output port b are allocated to the second power output port c, and are reflected back to the second power output port c. The reflected microwaves entering the second power output port c are again allocated to the third power output port d, and are absorbed by the absorbing loads connected to the third power output port d.

The pulsed microwave power 1c input from the power input port a at the second time period t2 is fed into the first accelerating tube 31 through the first power output port b of the four-port circulator 51. Since the first electronic beam is not configured with a beam loading at the second time period t2, more microwave energies entering from the first power output port b into the first accelerating tube 31 are reflected back to the first power output port b. Reflected microwaves entering the first power output port b are allocated to the second power output port c, and the second electronic beam at the second time period t2 is configured with a second beam loading 3a, and at the second time period t2, the second accelerating tube 32 generates an X-ray having a lower energy 4c (for example, 0.5-1 MeV) than the energies 4a, 4b of the X-rays generated by the first accelerating tube 31.

Through each embodiment of the above ray generating device of the present disclosure, while fully utilizing operating characteristics of the output power of each port of the microwave circulator, a single microwave power source is matched with the beam loading of an electronic beam generating device, to achieve output of multiple different ray energies, and satisfy the ray scanning requirements of different operating environments. Through chronological control of a controller, diversified ray energy output can be achieved, and stability of multiple-stage energy output can be ensured.

Figure 5:
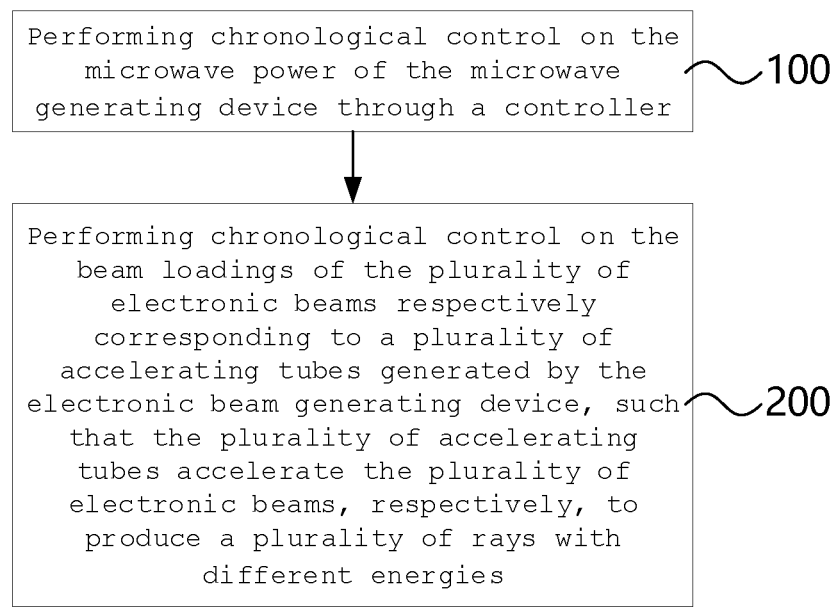
FIG. 5 is a schematic flowchart according to some embodiments of a control method of a ray generating device of the present disclosure.

FIG. 5 is a schematic flowchart according to some embodiments of a control method of a ray generating device of the present disclosure. Referring to FIG. 5, based on the embodiment of the above ray generating device, in some embodiments, the control method of the ray generating device includes step 100 and step 200. Step 100 and step 200 are performed synchronously according to chronological control instructions of the controller.

In the step 100, chronological control is performed on the microwave power of the microwave generating device 4 through a controller 1. In the step 200, chronological control is performed on the beam loadings of electronic beams respectively corresponding to a plurality of accelerating tubes 3 generated by the electronic beam generating device 2, and accelerating tubes 3 accelerate electronic beams, respectively, to produce a plurality of rays with different energies, for example, an X-ray.

Referring to FIG. 2, in some embodiments, the electronic beam generating device 2 includes: a first electronic gun 22 and a second electronic gun 24 respectively generating the first electronic beam and the second electronic beam, and a first electronic gun power source 21 and a second electronic gun power source 23 in signal connection with the controller 1 and connected with the first electronic gun 22 and the second electronic gun 24, respectively. Correspondingly, step 100 includes: through the controller 1, allowing the first electronic gun power source 21 to adjust the beam loading of the first electronic beam to be a first beam loadings 2a, 2b at the first time periods t11 and t12 in each period T of at least one period T, and allowing the second electronic gun power source 23 to adjust the beam loading of the second electronic beam to be a second beam loading 3a at the second time period t2 in each period T, and the first time periods t11 and t12 do not coincide with the second time period t2.

Referring to FIG. 2, in some embodiments, at least two power output ports of the microwave circulator 5 include a first power output port b and a second power output port c, the first power output port b is allocated with a microwave signal fed from the power input port a, and the second power output port c is allocated with a microwave signal fed from the first power output port b; and accelerating tubes 3 include: a first accelerating tube 31 connected with the first power output port b and the first electronic gun 22 and a second accelerating tube 32 connected with the second power output port c and the second electronic gun 24.

Correspondingly, step 200 includes: through the controller 1, allowing a microwave signal fed by the microwave generating device 4 into the power input port a of the microwave circulator 5 to include at least one first input microwave signal at the first time period, and allowing a microwave signal fed by the microwave generating device 4 into the power input port a of the microwave circulator 5 to include at least one second input microwave signal 1c at the second time period, and the power of at least one first input microwave signal is greater than that of the at least one second input microwave signal 1c.

In some embodiments, at least one first input microwave signal includes two first input microwave signals 1a and 1b located at different portions of the first time period (e.g., the first time period t11 and the first time period t12), and the power of the two first input microwave signals 1a and 1b is the same or different. The first beam loadings 2a and 2b of the first electronic beam corresponding to different portions t11 and t12 of the two first input microwave signals 1a and 1b at the first time period are the same or different.

In some embodiments, at least one second input microwave signal includes one second input microwave signal 1c located at the second time period t2. In some other embodiments, at least one second input microwave signal includes two second input microwave signals located at different portions of the second time period, and the power of the two second input microwave signals located at different portions of the second time period is the same or different, and the second beam loadings of the second electronic beam corresponding to different portions of the two second input microwave signals at the second time period are the same or different.

Multiple embodiments in the specification are described in a progressive manner, with different emphasis on each embodiment, and the same or similar parts of various embodiments can be referred by each other. As for the method embodiments, due to the correspondence between their entirety and the involved steps and the content in the apparatus embodiments, the description is relatively simple. Please refer to partial illustration of the apparatus embodiments for related details.

So far, various embodiments of the present disclosure have been described in detail. In order to avoid obscuring concepts of the present disclosure, some details that are well known in the art have not been described. To implement the embodiments disclosed here according to the above descriptions.

Although some specific embodiments of the present disclosure have been described in detail through examples, the above examples are only for illustration and are not intended to limit the scope of the present disclosure. The above embodiments can be modified or some features can be replaced by equivalents without departing from the scope and spirit of the present disclosure. The scope of the present disclosure is defined by appended claims.

What is claimed is:

1. A ray generating device, comprising:
   an electronic beam generating device, configured to generate a plurality of electronic beams;
   a microwave generating device, configured to generate a microwave;
   a microwave circulator, having a power input port and at least two power output ports, the power input port being connected to the microwave generating device through a waveguide structure;
   a plurality of accelerating tubes, connected to the electronic beam generating device and respectively connected to the at least two power output ports, configured to receive a plurality of electronic beams generated by the electronic beam generating device, respectively, and accelerate the plurality of electronic beams respectively through microwaves received from the at least two power output ports, so as to generate a plurality of rays having different energies, respectively; and
   a controller, in signal connection with the electronic beam generating device and the microwave generating device, configured to perform chronological control on microwave power of the microwave generating device, and chronological control on beam loadings of the electronic beams generated by the electronic beam generating device and respectively corresponding to the plurality of accelerating tubes.

2. The ray generating device according to claim 1, wherein the electronic beam generating device comprises:
   a first electronic gun, configured to generate a first electronic beam;
   a first electronic gun power source in signal connection with the controller and connected to the first electronic gun, configured to adjust the beam loading of the first electronic beam according to a chronological control signal provided by the controller;
   a second electronic gun, configured to generate a second electronic beam; and
   a second electronic gun power source in signal connection with the controller and connected to the second electronic gun, configured to adjust a beam loading of the second electronic beam according to a chronological control signal provided by the controller,
   wherein the controller is configured to allow the first electronic gun power source to adjust the beam loading of the first electronic beam to be a first beam loading; at a first time period in each period of at least one period, and to allow the second electronic gun power source to adjust the beam loading of the second electronic beam to be a second beam loading at a second time period in each period, the first time period does not coincide with the second time period.

3. The ray generating device according to claim 2, wherein the first beam loading is less than or equal to the second beam loading.

4. The ray generating device according to claim 2, wherein at least two power output ports of the microwave circulator comprise a first power output port and a second power output port, the first power output is allocated with a microwave signal fed from the power input port, and the second power output port is allocated with a microwave signal fed from the first power output port; and
   the plurality of accelerating tubes comprise:
   a first accelerating tube connected to the first power output port and the first electronic gun, configured to accelerate the first electronic beam through a first output microwave signal output by the first power output port (b); and
   a second accelerating tube connected to the second power output port and the second electronic gun, configured to accelerate the second electronic beam through a second output microwave signal output by the second power output port.

5. The ray generating device according to claim 4, wherein at least two power output ports of the microwave circulator further comprise a third power output port the third power output port is allocated with a microwave signal fed from the second power output port; and the ray generating device further comprises: an absorbing load connected to the third power output port, configured to absorb a microwave signal output by the third power output port.

6. The ray generating device according to claim 5, wherein the microwave circulator comprises a four-port circulator.

7. The ray generating device according to claim 4, wherein the controller is configured to allow a microwave signal fed by the microwave generating device to the power input port of the microwave circulator to comprise at least one first input microwave signal at the first time period, and to allow the microwave signal fed by the microwave generating device to the power input port of the microwave circulator to comprise at least one second input microwave signal at the second time period, and power of the at least one first input microwave signal is greater than that of the at least one second input microwave signal.

8. The ray generating device according to claim 1, wherein the microwave generating device comprises a magnetron.

9. A control method of the above ray generating device according to claim 1, comprising:
performing chronological control on the microwave power of the microwave generating device through the controller, and performing chronological control on the beam loadings of a plurality of electronic beams respectively corresponding to the plurality of accelerating tubes generated by the electronic beam generating device, wherein the plurality of accelerating tubes accelerate the plurality of electronic beams, respectively, to generate a plurality of rays having different energies.

10. The control method according to claim 9, wherein the electronic beam generating device comprises: a first electronic gun and a second electronic gun respectively generating a first electronic beam and a second electronic beam, and a first electronic gun power source and a second electronic gun power source in signal connection with the controller and connected with the first electronic gun and the second electronic gun, respectively;
wherein the step of performing chronological control on the beam loadings of a plurality of electronic beams respectively corresponding to a plurality of accelerating tubes through a controller comprises:
through the controller, allowing the first electronic gun power source to adjust the beam loading of the first electronic beam to be a first beam loading at a first time period in each period of at least one period, and allowing the second electronic gun power source to adjust the beam loading of the second electronic beam to be a second beam loading at a second time period in each period, wherein the first time period does not coincide with the second time period.

11. The control method according to claim 10, wherein at least two power output ports of the microwave circulator comprise a first power output port and a second power output port, the first power output is allocated with a microwave signal fed from the power input port, and the second power output is allocated with a microwave signal fed from the first power output port; the plurality of accelerating tubes comprise: a first accelerating tube connected with the first power output port band the first electronic gun and a second accelerating tube connected with the second power output port and the second electronic gun,
wherein the step of performing chronological control on the microwave power of the microwave generating device through the controller comprises:
through the controller, allowing a microwave signal fed by the microwave generating device into the power input port of the microwave circulator to comprise at least one first input microwave signal at the first time period, and allowing a microwave signal fed by the microwave generating device into the power input port of the microwave circulator to comprise at least one second input microwave signal at the second time period, and power of at least one first input microwave signal is greater than that of at least one second input microwave signal.

12. The control method according to claim 11, wherein the at least one first input microwave signal comprises two first input microwave signals located at different portions of the first time period, the power of the two first input microwave signals is the same or different, and the first beam loadings of the first electronic beam corresponding to different portions of the two first input microwave signals at the first time period are the same or different.

13. The control method according to claim 11, wherein the at least one second input microwave signal comprises two second input microwave signals located at different portions of the second time period, the power of the two second input microwave signals is the same or different, and the second beam loadings of the second electronic beam corresponding to different portions of the two second input microwave signals at the second time period are the same or different.

* * * * *